(12) United States Patent
Nakagawa

(10) Patent No.: US 11,422,422 B2
(45) Date of Patent: Aug. 23, 2022

(54) LIQUID CRYSTAL DISPLAY PANEL WITH A SECOND WIRING LAYER DIFFERENT FROM A FIRST WIRING LAYER

(71) Applicant: Panasonic Liquid Crystal Display Co., Ltd., Himeji (JP)

(72) Inventor: Teruhisa Nakagawa, Hyogo (JP)

(73) Assignee: PANASONIC LIQUID CRYSTAL DISPLAY CO., LTD., Himeji (JP)

( * ) Notice: Subject to any disclaimer, the term of this patent is extended or adjusted under 35 U.S.C. 154(b) by 0 days.

(21) Appl. No.: 16/796,266

(22) Filed: Feb. 20, 2020

(65) Prior Publication Data
US 2021/0223652 A1    Jul. 22, 2021

(30) Foreign Application Priority Data
Jan. 21, 2020   (CN) .......................... 202010072169.3

(51) Int. Cl.
G02F 1/1362    (2006.01)

(52) U.S. Cl.
CPC .... *G02F 1/136286* (2013.01); *G02F 1/13629* (2021.01); *G02F 2201/123* (2013.01)

(58) Field of Classification Search
CPC combination set(s) only.
See application file for complete search history.

(56) References Cited

U.S. PATENT DOCUMENTS 6,307,216 B1 * 10/2001 Huh ...................... G02F 1/1309
                                                                              257/59
2018/0210303 A1    7/2018 Wang

FOREIGN PATENT DOCUMENTS

CN           106125427 B        5/2019

* cited by examiner

*Primary Examiner* — Lauren Nguyen
(74) *Attorney, Agent, or Firm* — WHDA, LLP

(57) ABSTRACT

A liquid crystal display panel, comprising: a plurality of source lines extending in a first direction, and including a first source line and a second source line; a plurality of gate lines extending in a second direction different from the first direction, and crossing the plurality of source lines; and a plurality of pixel units defined by the plurality of source lines and the plurality of gate lines, in which a plurality of transistors and a plurality of pixel electrode are disposed, respectively; the first source line and the second source line are respectively connected to two adjacent rows of the pixel unit; wherein the first source line comprises a first line segment disposed on a first wiring layer; the second source line comprises a second line segment, and the second line segment is disposed on a second wiring layer different from the first wiring layer.

10 Claims, 13 Drawing Sheets

LIQUID CRYSTAL DISPLAY PANEL WITH A SECOND WIRING LAYER DIFFERENT FROM A FIRST WIRING LAYER

CROSS-REFERENCE TO RELATED APPLICATION

This application is based on and claims priority of Chinese application No. 202010072169.3 filed on Jan. 21, 2020. The entire disclosure of the above-identified application, including the specification, drawings and claims is incorporated herein by reference in its entirety.

TECHNICAL FIELD

The present disclosure relates to the field of liquid crystal display technology, and more particularly to a liquid crystal display panel.

BACKGROUND ART

In order to meet the users' needs for high-definition display of liquid crystal display panels, the approach in the conventional art is to increase the number of pixel units in the liquid crystal display panel. However, the increase in the number of pixel units shortens the period required by a gate line for writing a voltage to each row of pixel units, this makes the voltage writing difficult.

In this regard, as disclosed in the related art, such as the patent document CN106125427B, two adjacent rows of gate lines are usually electrically connected to realize the voltage writing to two gate lines simultaneously, thereby solving the issue of short period for voltage writing.

SUMMARY

In the related art, since the two gate lines obtain the same driving signal simultaneously, in order to enable the transistors of the two rows of corresponding pixel units to be written with different voltage signals from a source when driven simultaneously, it is necessary to make the two rows of pixel units obtain different voltage signals from source lines respectively. Therefore, in comparison with a conventional liquid crystal display panel, a source line needs to be added between the two adjacent columns of pixel units, that is, two parallel source lines are disposed in the same wiring layer between the two adjacent columns of pixel units so as to correspond to the two columns of pixel units, respectively.

However, the increase in the number of source lines in the related art leads to an increase in the space required for laying out the source lines, and a decrease in the aperture ratio of the display panel, which affects the display effect of the liquid crystal display panel. Therefore, it is necessary to improve the existing liquid crystal display panel.

In view that there is a problem in the related art that the increase in the number of sources lines between two adjacent columns of pixel units in a liquid crystal display panel affects the aperture ratio, the present disclosure provides a liquid crystal display panel, comprising a plurality of source lines extending in a first direction, and including a first source line and a second source line; a plurality of gate lines extending in a second direction different from the first direction, and crossing the plurality of source lines; and a plurality of pixel units defined by the plurality of source lines and the plurality of gate lines, in which a plurality of transistors and a plurality of pixel electrodes are disposed, respectively; the first source line and the second source line are respectively connected to two adjacent rows of the pixel unit; wherein the first source line comprises a first line segment disposed on a first wiring layer; the second source line comprises a second line segment, and the second line segment is disposed on a second wiring layer different from the first wiring layer.

If two source lines disposed between two adjacent pixel units are completely located on the same wiring layer, a wider wiring area is required in the planar direction of the liquid crystal display layer to dispose the two source lines, thereby directly resulting in a decrease in the aperture ratio of the display panel. Meanwhile, while ensuring insulation, it is also necessary to shorten the distance between the two source lines as much as possible, which sets a higher requirement for the manufacturing process.

However, by disposing the first line segment of the first source line and the second line segment of the second source line on different wiring layers, it is possible to utilize, the direction perpendicular to the planar direction of the liquid crystal display panel, that is, the first line segment and the second line segment are disposed on wiring layers differently located in the perpendicular direction, so as to narrow the wiring area required for disposing the source line in the planar direction of the liquid crystal display panel, and thereby improve the aperture ratio of the display panel. Meanwhile, as being disposed on different wiring layers, the first line segment and the second line segment may be located in multiple ways, such as juxtaposed, overlapping and partially overlapping. In comparison with the arrangement in the related art that the two source lines are disposed in parallel on the same wiring layer, this disclosure brings more diversified options for the arrangement of the first source line and the second source line while increasing aperture ratio.

In the embodiment of the present disclosure, at least a portion of the first line segment and the second line segment are located between two adjacent columns of the pixel electrodes.

If the two source lines disposed in parallel between two adjacent pixel units are located on the same wiring layer, a wider wiring area is required in the planar direction of the liquid crystal display layer to dispose the two source lines, thereby directly resulting in a decrease in the aperture ratio of the display panel. However, in the embodiment, at least a portion of the first line segment and the second line segment located on different wiring layers are disposed between two adjacent columns of the pixel electrodes, it is possible to utilize the direction perpendicular to the planar direction of the liquid crystal display panel, that is, the first line segment and the second line segment are disposed on wiring layers differently located in the perpendicular direction, so as to narrow the wiring area required for disposing the source line in the planar direction of the liquid crystal display panel, and thereby effectively improve the aperture ratio of the display panel. In the embodiment of the present disclosure, at least a portion of the first line segment and the second line segment overlap each other in a direction perpendicular to the liquid crystal display panel.

In the embodiment, at least a portion of the first line segment and the second line segment overlap each other in a direction perpendicular to the liquid crystal display panel. In comparison with the two source lines disposed in parallel in the planar direction in the related art, this disclosure reduces the space occupied by the first source line and the second source line in the planar direction, and further improves the aperture ratio of the display panel.

In the embodiment of the present disclosure, the display panel further includes: a first contact hole, which is located between two adjacent columns of the pixel units and adjacent to the gate line; and a first plug, Which is located in the first contact hole and is electrically connecting the first source line or the second source line of different wiring layers.

In the embodiment of the present disclosure, the display panel further includes: a second contact hole, which is disposed at a position closer to the pixel electrode than the first contact hole and disposed adjacent to the gate line; and a second plug, which is located in the second contact hole and is electrically connected to the first source line or the second source line of different wiring layers.

The first source line and the second source line both have line segments disposed on different wiring layers respectively, the first contact hole and the first plug enable the electrical connection to the line segment of the first source line located on a different wiring layer, and the second contact hole and the second plug enable the electrical connection to the line segment of the second source line located on a different wiring layer, such that the line segments of the first source line located on different wiring layers are electrically connected, and the line segments of the second source line located on different wiring layers are electrically connected, so as to switch the wiring of the first source line and the second source line on different wiring layers.

In the embodiment of the present disclosure, the gate lines include a first gate line and a second gate line, and the first gate line is electrically connected to a second gate line which is adjacent to the first gate line.

According to the disclosure, the adjacent first and second gate lines are electrically connected, such that two adjacent pixel units connected to the first gate line and the second gate line obtain the same driving signal simultaneously, and meanwhile, the two adjacent pixel units obtain different voltage signals respectively, thereby realizing the smooth application of voltage while improving the aperture ratio of the display panel.

In the embodiment of the present disclosure, a plurality of the second contact holes are staggeredly located on both sides of the corresponding first line segment of the first source line or the second line segment of the second source line.

In the aspect of embodiment, a plurality of the second contact holes are staggeredly located on both sides of the corresponding first line segment of the first source line or the second line segment of the second source line one by one, so as to realize the connection of the first source line and the second source line to the pixel units located in different columns respectively, which facilitates the wiring design of the first source line and the second source line, provides room for the design of the driving circuit of the source line, and improves the compatibility of the liquid crystal display panel.

In the embodiment of the present disclosure, a plurality of the second contact holes are all located on the same side of the corresponding first line segment of the first source line or the second line segment of the second source line.

In the aspect of embodiment, a plurality of the second contact holes are all located on the same side of the corresponding first line segment of the first source line or the second line segment of the second source line, so as to realize the connection of the first source line and the second source line to the pixel units located in the same column, which provides diversified options for the wiring design of the first source line and the second source line, provides more room for the design of the driving circuit of the source line, and improves the compatibility of the liquid crystal display panel.

In the embodiment of the present disclosure, one of a first line segment of the first source line and the second line segment of the second source line which is adjacent to the gate line layer is arranged at the same wiring layer with the gate lines.

In the aspect of embodiment, one of a first line segment of the first source line and the second line segment of the second source line which is adjacent to the gate line layer is arranged at the same wiring layer with the gate lines, such that the original space of the liquid crystal display panel can be utilized, and the thickness of the liquid crystal display panel will not increase because of the arrangement of any source line on a different wiring layer. In addition, the current wiring layer (gate line layer) of the liquid crystal display panel can be utilized to lay the first line segment of the first source line or the second line segment of the second source line on the same layer while laying the source lines, which simplifies the manufacturing process, improves the manufacturing efficiency and reduces the manufacturing cost.

In the embodiment of the present disclosure, one of a first line segment of the first source line and the second line segment of the second source line which is adjacent to the gate line layer is arranged on an upper side of the gate line layer.

In the aspect of embodiment, one of a first line segment of the first source line and the second line segment of the second source line which is adjacent to the gate line layer is arranged on an upper side of the gate line layer, such that the first source line and the second source line are disposed independent of the current gate line layer, without changing the mask of the current gate line layer, which reduces the manufacturing cost.

In the embodiment of the present disclosure, there is also included: a first notch, which is formed at an edge of the gate lines and a position corresponding to the first source line and the second source line, and the first contact hole is at least partially formed at a position of the first notch.

In the embodiment of the present disclosure, there is also included: a second notch, which is formed at the edge of the gate lines and a position corresponding to the first source line and the second source line, and the second contact hole is at least partially formed at a position of the second notch.

In the aspect of embodiment, the first notch and the second notch are formed at an edge of the gate line area and recessed into the gate line area, and the first contact hole and the second contact hole are respectively formed at a position of the first notch and the second notch, such that the first contact hole and the second contact hole can be formed by utilizing a part that originally belongs to the gate line area, so as to reduce the impact of the arrangement of the source lines on the pixel units as much as possible, and further improve the aperture ratio of the display panel.

DETAILED DESCRIPTION OF THE EMBODIMENTS

Figure 1:
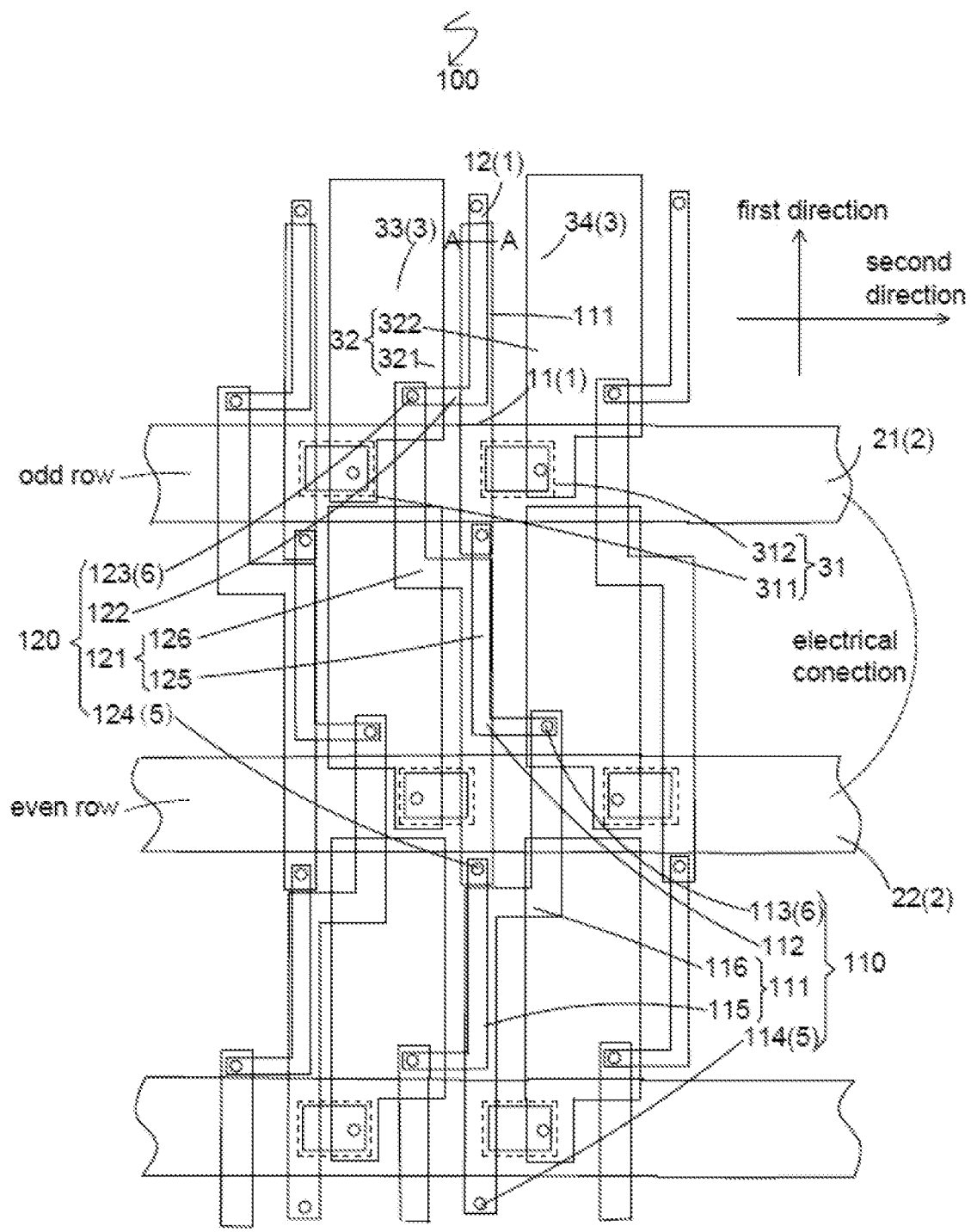
FIG. 1 is a partial structural schematic view of a liquid crystal display panel provided by a first embodiment of the present disclosure.
Figure 2:
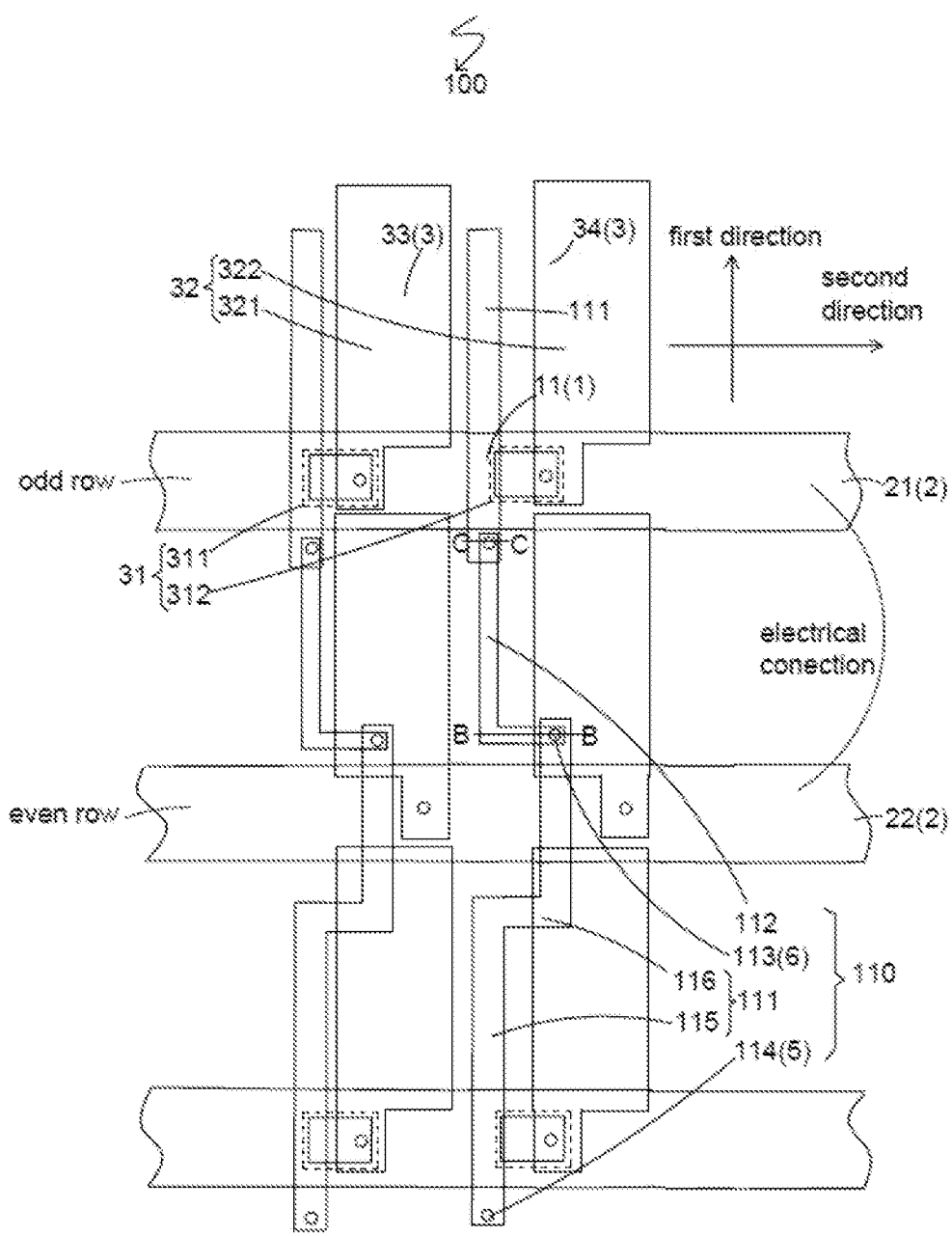
FIG. 2 is a partial structural schematic view of the liquid crystal display panel in FIG. 1 with a second source line removed.
Figure 3:
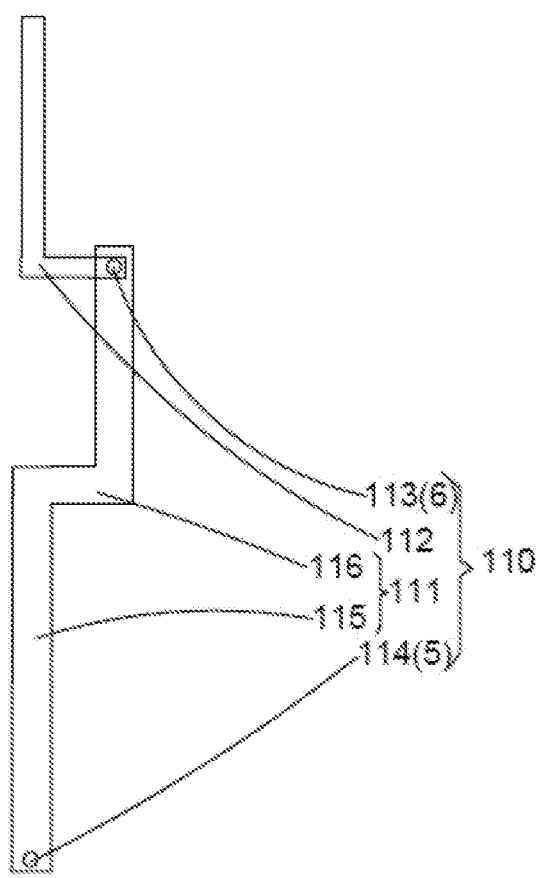
FIG. 3 is a structural schematic view of the first wiring unit.
Figure 4:
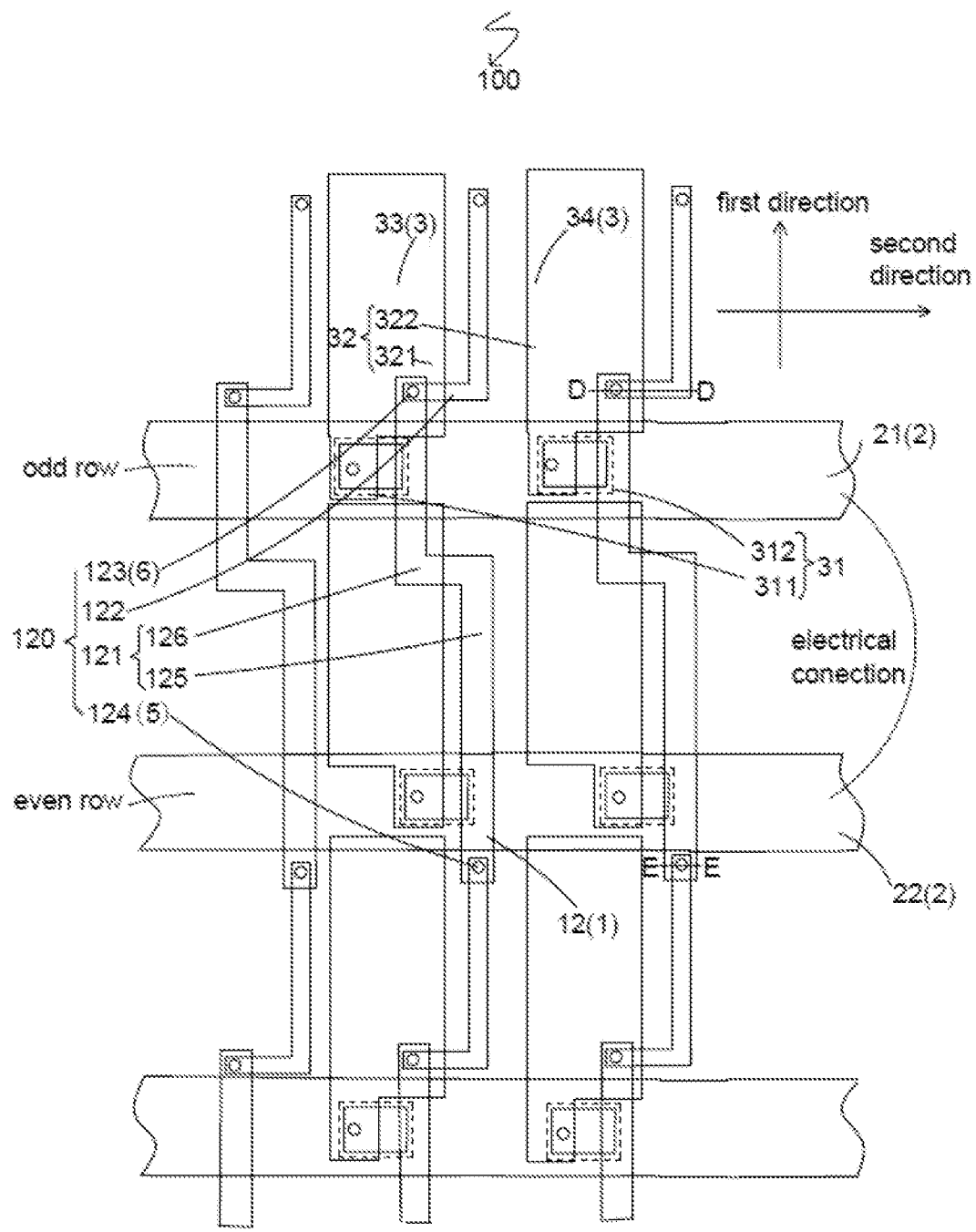
FIG. 4 is a partial structural schematic view of the liquid crystal display panel in FIG. 1 with a first source line removed.
Figure 5:
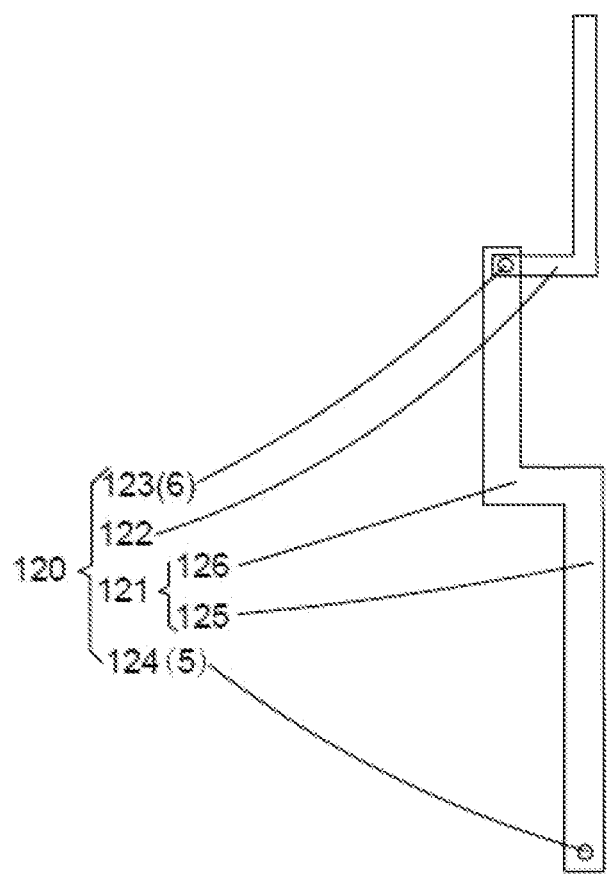
FIG. 5 is a structural schematic view of the second wiring unit.
Figure 6:
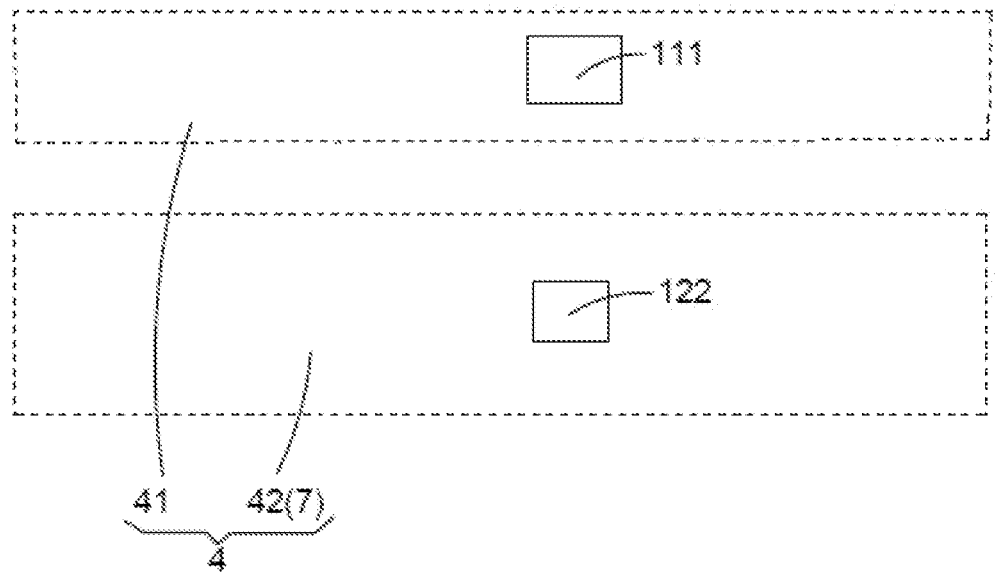
FIG. 6 is a cross-sectional view taken along the line A-A in FIG. 1.
Figure 7:
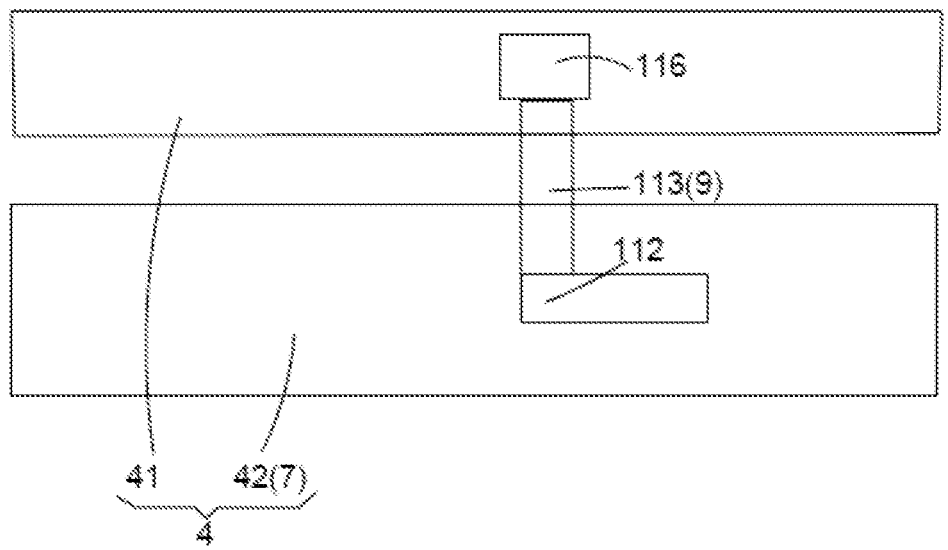
FIG. 7 is a cross-sectional view taken along the line B-B in FIG. 2.
Figure 8:
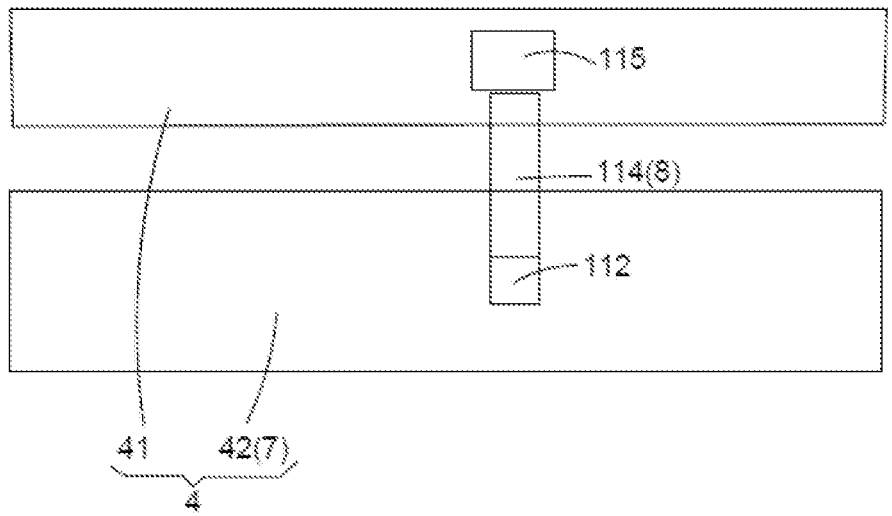
FIG. 8 is a cross-sectional view taken along the line C-C in FIG. 2.
Figure 9:
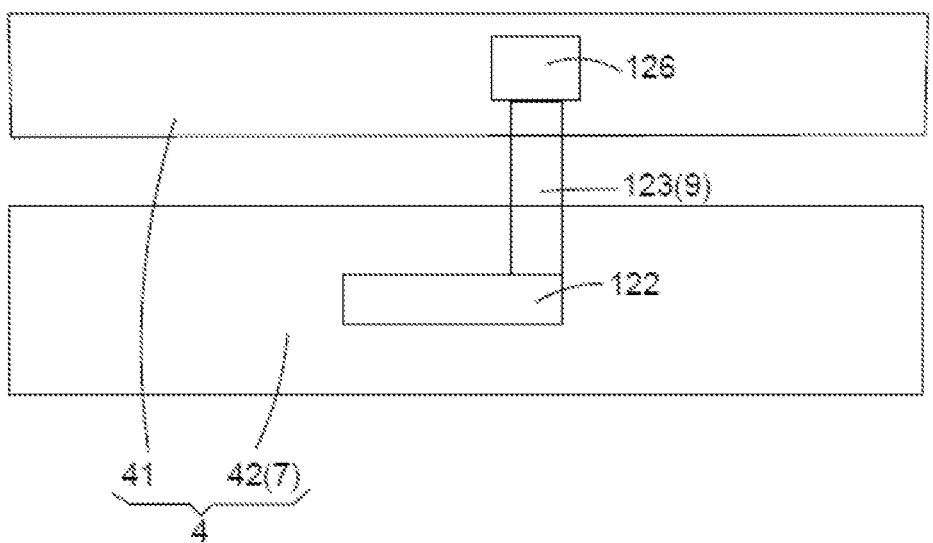
FIG. 9 is a cross-sectional view taken along the line D-D in FIG. 4.
Figure 10:
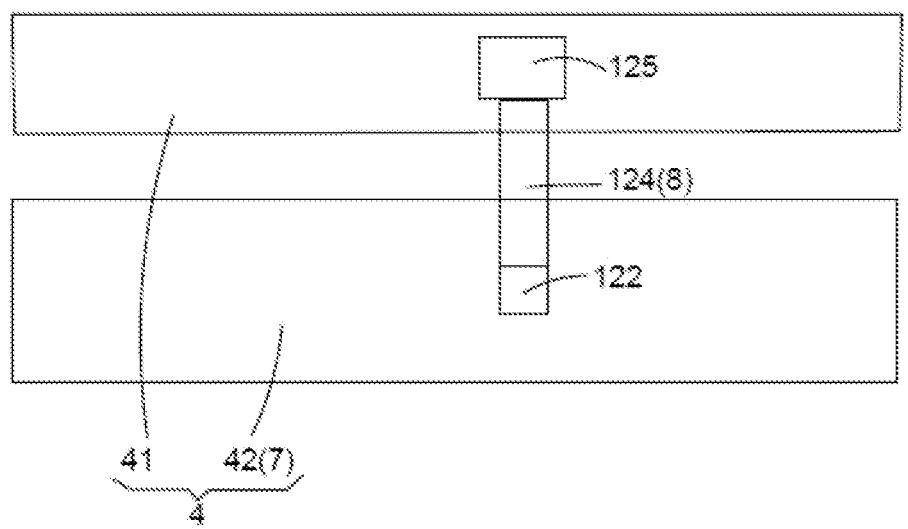
FIG. 10 is a cross-sectional view taken along the line E-E in FIG. 4.

Exemplary embodiments will be described in detail with reference to the drawings. However, the present disclosure is not limited to the following embodiments, and includes various alterations, replacements and variations within the technical scope of the present disclosure.

In the drawings, for the sake of clear explanation, the dimensions of layers and areas are not necessarily to scale. The terms, such as "first" and "second" may be used to explain various elements, and the number of elements is not restricted by such terms. These terms are only used to distinguish one element from the other. Unless otherwise specified, use of a singular form does not exclude a plural form.

In the following description, the term "comprise" or "include" is used to indicate a feature, number, step, operation, element, portion, or the combination thereof, and does not exclude other feature, number, step, operation, element, portion or the combination thereof. It shall be understood that when an element, such as a layer, membrane, region or plate, is described as "above" or "under" other element, the element may be directly on the other element, or there may be one or more intermediate elements between them. In addition, when an element is described as "directly" "on" the other element, there is no intermediate layer between them.

First Embodiment

The liquid crystal display panel 100 provided by the present embodiment is shown as in FIGS. 1 to 5, which mainly comprises: a plurality of source lines 1, a plurality of gate lines 2 and a plurality of pixel units 3; wherein a plurality of source lines 1 extend in a first direction, a plurality of gate lines 2 extend in a second direction different from the first direction, and cross the plurality of source lines 1; and a plurality of pixel units 3 are defined by the plurality of source lines 1 and the plurality of gate lines 2 that cross each other. As a embodiment of the present embodiment, the plurality of source lines 1 and the plurality of gate lines 2 are disposed orthogonally. For easy explanation, in the present embodiment, the first direction is defined as a column direction, which is a vertical direction as shown in FIG. 1, and the second direction is defined as a row direction, which is a horizontal direction as shown in FIG. 1.

To be specific, the source line 1 includes a first source line 11 and a second source line 12 connected to two adjacent rows of pixel units 3. The first source line 11 is connected to one of two adjacent rows of pixel units 3 and the second source line 12 is connected to another of two adjacent rows of pixel units 3.

More specifically, in the present embodiment, the first source line 11 is connected to the pixel units 3 in odd rows, and the second source line 12 is connected to the pixel units 3 in even rows. The gate lines 2 include a first gate line 21 and a second gate line 22. In other words, the first gate line 21 is connected to the pixel units 3 in odd rows, the second gate line 22 is connected to the pixel units 3 in even rows, and the first gate line 21 is electrically connected to a second gate line 22 adjacent to the first gate line 21.

The pixel unit 3 includes a transistor 31 and a pixel electrode 32. For easy explanation, in the present embodiment, as shown in FIGS. 1 to 5, the pixel units 3 are respectively named as a first pixel unit 33 in odd columns and a second pixel unit 34 in even columns. That is, the first source line 11 is connected to the second pixel unit 34, and the second source line 12 is connected to the first pixel unit 33. Correspondingly, the transistor 31 includes a first transistor 311 corresponding to the first pixel unit 33 and a second transistor 312 corresponding to the second pixel unit 34, and the pixel electrode 32 includes a first pixel electrode 321 corresponding to the first pixel unit 33 and a second pixel electrode 322 corresponding to the second pixel unit 34.

In the embodiment of the present embodiment, the pixel electrode 32 is mainly formed of indium tin oxide (ITO), indium zinc oxide (IZO) and the like, the potential difference between the pixel electrode 32 and a common electrode (not shown) can decide the deflection angle of liquid crystal molecules (not shown) disposed between the pixel electrode 32 and the common electrode (not shown), thereby displaying different images in cooperation with a color filter (not shown) of the liquid crystal display panel 100. The transistor 31 is usually a thin film transistor, including a source electrode (not shown), a gate electrode (not shown) and a drain electrode (not shown), wherein the source electrode is connected to the source line 1, the gate electrode is connected to the gate line 2, and the drain electrode is connected to the pixel electrode 32. A voltage is written into the gate line 2 to drive the corresponding transistor 31, the transistor 31 is brought into conduction and can transmit a voltage signal applied to the source line 1 to the pixel electrode 32 so as to generate a corresponding potential difference is between the pixel electrode 32 and the common electrode, and drive the liquid crystal molecules into deflection.

In the present embodiment, the orthographic projection of the pixel electrode 32 in the planar direction of the liquid crystal display panel 100 (hereinafter referred to as the planar direction) is within the area of the gate line 2, that is, the part of the source line 1 corresponding to the gate line 2 in the planar direction is connected to the transistor 31.

It shall be explained that in the above structure, the first gate line 21 is electrically connected to a second gate line 22 adjacent to the first gate line 21, to be specific, the first gate line 21 and a second gate line 22 adjacent thereto form an electrically connected gate line unit (not shown), and each gate line unit is driven by the same driving signal, which is usually a voltage signal. The reasons for such connection lie in that in order to satisfy the users' need for high-definition display of liquid crystal display panels, it is necessary to increase the number of the pixel units in the liquid crystal display panel correspondingly; after the number of pixel units increases, when the source line 1 writes voltage into the pixel units row by row, the time for writing voltage into each row of pixel units 3 becomes shorter, which renders the writing of voltage difficult. Thus, by electrically connecting the first gate line 21 to a second gate line 22 which is adjacent to the first gate line 21, the application of driving signal into two gate lines 2 can be realized simultaneously, which increases the time for wiring voltage into each row of pixel units 3 and solves the problem of difficulty in the application of driving signal.

Since the two gate lines 2 obtain the same driving signal simultaneously, it is necessary to enable two rows of pixel units 3 to obtain different voltage signals respectively from the source line 1 so as to write different voltage signals from the source into the transistors 31 in the two corresponding rows of pixel units 3 when driven at the same time. Thus, in comparison with the current liquid crystal display panel, one source line 1 needs to be added between two adjacent columns of pixel units 3. That is, the first source line 11 is connected to the second pixel unit 34 electrically connected to the first gate line 21, and the second source line 12 is connected to the first pixel unit 33 so as to write different voltage signals respectively into the source electrodes of the two rows of transistors 31, into which the gate can also apply the same driving signal simultaneously.

Although the above embodiment solves the problem of difficulty in the application of driving signal, the increase in the number of the source lines 1 requires a larger room for arranging the source lines 1. In the related art, the first source line 11 and the second source line 12 are usually arranged in parallel in the same planar direction, so the room for arranging the source lines 1 is substantially twice as large as the conventional conventional liquid crystal display panel, that is the required space for the source lines 1 is doubled, thereby reducing the aperture ratio of the display panel and affecting the display effect of the liquid crystal display panel. In order to solve the above problem, i.e., to reduce the influence of increased source lines 1 on the aperture ratio of the display panel, a portion of the line segments of the first source line 11 and the second source line 12 are disposed on different wiring layers 4 in the liquid crystal display panel 100 provided in the present embodiment.

To be specific, as shown in FIGS. 6 to 10, in the present embodiment, the wiring layer 4 for arranging the source lines 1 is divided into a first wiring layer 41 and a second wiring layer 42. More specifically, for easy explanation, in the present embodiment, the wiring layer 4 that is further away from the gate line 2 in the normal direction of the planar direction is defined as the first wiring layer 41, and the other wiring layer 4 is defined as the second wiring layer 42.

The specific arrangement of the first source line 11 and the second source line 12 will be explained with reference to FIGS. 1 to 10. The first source line 11 is formed by mutually and continuously connecting a plurality of first wiring units 110, wherein each of the first wiring units 110 is substantially arranged in the same way and corresponding to one of the second transistors 312, to be specific, the first wiring unit 110 has a first line segment 111 arranged in the first wiring layer 41, a third line segment 112 arranged in the second wiring layer 42, a fourth line segment 113 used for connecting the first line segment 111 and the third line segment 112 of the same first wiring unit 110, and a fifth line segment 114 used for connecting the first line segment 111 and the third line segment 112 that respectively belong to two adjacent first wiring units 110. Correspondingly, the second source line 12 is formed by connecting a plurality of second wiring units 120, wherein each of the second wiring units 120 is substantially arranged in the same way and corresponding to one of the first transistors 311, to be specific, the second wiring unit 120 has a sixth line segment 121 arranged in the first wiring layer 41, a second line segment 122 arranged in the second wiring layer 42, a seventh line segment 123 used for connecting the sixth line segment 121 and the second line segment 122 of the same second wiring unit 120, and an eighth line segment 124 used for connecting the sixth line segment 121 and the second line segment 122 that respectively belong to two adjacent second wiring units 120.

It shall be explained that, in the present embodiment, the second line segment 122 is much closer to the gate line layer 7 than the first line segment 111. In some embodiments, the first line segment 111 may be disposed closer to the gate line layer 7 than the second line segment 122.

It shall be explained that, as shown in FIGS. 6 to 10, the first wiring layer 41 and the second wiring layer 42 may be spaced by an insulating medium layer (not shown). In some embodiments, the first wiring layer 41 may be directly disposed on the second wiring layer 42.

In the embodiment of the present embodiment, the first line segment 111 or the second line segment 122 which is close to the gate line layer 7 provided with the gate line 2 is arranged in the same wiring layer as the gate line 2. In the present embodiment, the second line segment 122 and the gate line 2 are arranged in the same wiring layer, in such a way that the original space of the liquid crystal display panel 100 can be utilized, and the thickness of the liquid crystal display panel 100 is unlikely to be increased because the source line 1 is arranged in a different wiring layer. In addition, the current wiring layer (the gate line layer 7) of the liquid crystal display panel 100 can be utilized to arrange the gate line 2, as well as the second line segment 122, which simplifies the manufacturing process, improves the manufacturing efficiency and reduces the manufacturing cost.

It shall be explained that, in the present embodiment, the positional relation between the first line segment 111 and the second line segment 122 is used as an example for illustration, but not a limitation to the present embodiment. As shown in the embodiment of the present embodiment, the second wiring layer 42 and the gate line layer 7 may be disposed on the same layer, or partially overlap each other spatially in a normal direction along the planar direction.

In the embodiment of the present embodiment, in order to realize the connecting arrangement of the first source line 11 or the second source line 12 between the first wiring layer 41 and the second wiring layer 42, the first wiring layer 41 and/or the second wiring layer 42 is also provided with a first contact hole 5 and a second contact hole 6. To be specific, as shown in FIGS. 1 to 5, the first contact hole 5 which is formed by at least partially passing through the first wiring layer 41 and/or the second wiring layer 42 is disposed between the first pixel unit 33 and the second pixel unit 34 and adjacent to the gate line 2. The second contact hole 6 which is formed by at least partially passing through the first wiring layer 41 and/or the second wiring layer 42 is disposed at a position closer to the pixel electrode 32 than the first contact hole 5 and disposed adjacent to the gate line 2. The first contact hole 5 of the first source line 11 and the second contact hole 6 of the second source line 12 disposed adjacent to the same gate line 2 are respectively arranged at both sides of the gate line 2 in the first direction. The first contact hole 5 of the second source line 11 and the second contact hole 6 of the first source line 12 disposed adjacent to the same gate line 2 are respectively arranged at both sides of the gate line 2 in the first direction.

Furthermore, the first contact hole 5 is provided therein with a first plug 8 used for electrically connecting a portion of respective line segments of the first source line 11 or the second source line 12 respectively located on the first wiring layer 41 and the second wiring layer 42.

The second contact hole 6 is provided therein with a second plug 9 used for electrically connecting a portion of respective line segments of the first source line 11 or the second source line 12 respectively located on the first wiring layer 41 and the second wiring layer 42.

More specifically, the first plug 8 in the first contact hole 5, which is located between the two adjacent columns of pixel units (the first pixel unit 33 and the second pixel unit 34) and adjacent to the first gate line 21, forms the fifth line segment 114 of the first wiring unit 110. The second plug 9 in the second contact hole 6, which is located in the area of the pixel electrode 321 of the first pixel unit 33 or in the area of the pixel electrode 322 of the second pixel unit 34, and adjacent to the first gate line 21, forms the seventh line segment 123 of the second wiring unit 120.

The first plug 8 in the first contact hole 5, which is located between the two adjacent columns of pixel units (the first pixel unit 33 and the second pixel unit 34) and adjacent to the second gate line 22, forms the eighth line segment 124 of the second wiring unit 120. The second plug 9 in the second contact hole 6, which is located in the area of the pixel electrode 321 of the first pixel unit 33 or in the area of the pixel electrode 322 of the second pixel unit 34, and adjacent to the second gate line 22, forms the fourth line segment 113 of the first wiring unit 110. Furthermore, the first line segment 111 includes a first portion 115 substantively extending in the first direction by taking the position of the first wiring layer 41 corresponding to the fifth line segment 114 as a starting point and located between the first pixel unit 33 and the second pixel unit 34. Both ends of the first portion 115 are respectively located at both sides of the first gate line 21, and connected to the source electrode of the first transistor 312 at a position corresponding to the first transistor 312 in the planar direction. Correspondingly, the sixth line segment 121 includes a first portion 125 substantively extending in the first direction by taking the position of the first wiring layer 41 corresponding to the eighth line segment 124 as a starting point and located between the first pixel unit 33 and the second pixel unit 34. Both ends of the first portion 125 are respectively located at both sides of the second gate line 22, and connected to the source electrode of the second transistor 311 at a position corresponding to the second transistor 311 in the planar direction.

It shall be explained that in the present embodiment, the first source line 11 is connected with the second pixel unit 34, and the second source line 12 is connected with the first pixel unit 33. Thus, correspondingly, the first portion 115 is connected with the first transistor 312 and the sixth portion 125 is connected with the second transistor 311.

Furthermore, as a embodiment, the second contact holes 6 of the first source line 11 are located on a right side of the second source line 12. The second contact holes 6 of the second source line 12 are located on a left side of the first source line 11. That is, the second contact holes 6 are staggeredly located on both sides of the area of the corresponding first line segment 111 or the second line segment 122 located between the first pixel unit 33 and the second pixel unit 34 one by one.

The second contact holes 6 are respectively staggeredly located on both sides of the area located between the first pixel unit 33 and the second pixel unit 34 one by one, i.e., staggeredly located on both sides of the first line segment 111 or the second line segment 122, so as to facilitate the connection of the first source line 11 and the second source line 12 with their respective transistors 31. In such an arrangement, since the transistors 31 in odd rows are connected with the first source line 11, the transistors 31 in odd rows are disposed adjacent to the first portion 115. Correspondingly, since the transistors 31 in even rows are connected with the second source line 12, the transistors 31 in even rows are disposed adjacent to the first portion 125, that is, the transistors 31 in two adjacent columns of pixel units 3 may be disposed adjacent to the source line 1 connected therewith.

Furthermore, the first portion 115 of the first wiring unit 110 and the first portion 125 of the second wiring unit 120 are disposed adjacent to each other and spaced apart, that is, the first portion 115 and the first portion 125 are staggeredly disposed between the first pixel unit 33 and the second pixel unit 34 in the first direction, and are connected with the corresponding transistor 31.

Furthermore, in the present embodiment, in order to realize the continuous arrangement of the first wiring unit 110, the first portion 115 extends in the second direction from an end adjacent to the eighth line segment 124 to a position corresponding to the fourth line segment 113 in the second direction, and extends in the first direction to an end of the fourth line segment 113 adjacent to the first wiring layer 41 so as to be electrically connected with the fourth line segment 113 to form a second portion 116. The third line segment 112 starts from an end of the fourth line segment 113 adjacent to the second wiring layer 42, and is electrically connected with the fourth line segment 113 and extends in the second direction to a position corresponding to the fifth line segment 114 in the second direction, and then extends in the first direction to an end of the fifth line segment 114 adjacent to the second wiring layer 42 for electrical connection.

Correspondingly, in the present embodiment, in order to realize the continuous arrangement of the second wiring unit 120, a first portion 125 extends in the second direction from an end adjacent to the fifth line segment 114 to a position corresponding to the seventh line segment 123 in the second direction, and extends in the first direction to an end of the seventh line segment 123 adjacent to the first wiring layer 41 so as to be electrically connected with the seventh line segment 123 to form a second portion 126. The second line segment 122 starts from an end of the seventh line segment 123 adjacent to the second wiring layer 42, and is electrically connected with the seventh line segment 123 and extends in the second direction to a position corresponding to the eighth line segment 124 in the second direction, and then extends in the first direction to an end of the eighth line segment 124 adjacent to the second wiring layer 42 for electrical connection.

This realizes the arrangement of the first source line 11 and the second source line 12 on the second wiring layer 42, the connection between the first wiring units 110 and the connection between the second wiring units 120, thereby further realizing the winding arrangement of the first source line 11 and the second source line 12, and the switching of them between different wiring layers.

In the embodiment of the present embodiment, the second contact hole 6 is disposed outside of the source line arrangement area between the first pixel unit 33 and the second pixel unit 34, that is, a portion of line segments of the first source line 11 and the second source line 12 are wound around the outside of the source line arrangement area. In this way, the area required for arranging the source line between the first pixel unit 33 and the second pixel unit 34 needs to provide a space for arranging one source line in the widthwise direction. In other words, in the present embodiment, although two source lines, namely the first source line 11 and the second source line 12, are disposed between the first pixel unit 33 and the second pixel unit 34, the source line arrangement manner of the present embodiment requires a space for one source line in the planar direction, which greatly improves the aperture ratio of the display panel in comparison with the related art.

It shall be explained that the first line segment 111 and the second line segment 122 are partially located between the first pixel electrode 321 and the second pixel electrode 322, and the first line segment 111 and the second line segment 122 partially overlap each other in a direction perpendicular to the liquid crystal display panel 100. Overlap herein includes not only partially overlap in the second direction, but also fully overlap in the second direction. It also includes the case that the first line segment 111 and the second line segment 122 are partially staggeredly disposed and do not overlap each other in a direction perpendicular to the liquid crystal display panel 100. It shall be explained that "overlap" herein refers to the projections of the first line segment 111 and the second line segment 122 partially overlap on the plane of the liquid crystal display panel 100.

Even though the first line segment 111 and the second line segment 122 are partially staggeredly disposed and do not overlap each other, such as when they are closely adjacent to each other in the projection direction, it is because the first line segment 111 and the second line segment 122 are disposed on different wiring layers so that the insulation therebetween can be ensured, which can also realize a compact wiring design while improving the aperture ratio of the display panel.

Preferably, a portion of the first line segment 111 and the second line segment 122 overlap each other in a direction perpendicular to the liquid crystal display panel 100, i.e., the projections thereof on the plane of the liquid crystal display panel 100 overlap each other, which reduces the widthwise space required for arranging source lines between the first pixel electrode 321 and the second pixel electrode 322, and further improves the aperture ratio of the display panel.

In general, by winding a portion of the line segment of the source line 1 on the first wiring layer 41 around the outside of the source line arrangement area between the first pixel electrode 321 and the second pixel electrode 322, and switching the part of the line segment from the outside to the second wiring layer 42 different from the first wiring layer 41, the present embodiment realizes the mutual evasion of the first source line 11 and the second source line 12 on the first wiring layer 41 at a position connected with the corresponding pixel unit 3. In comparison with the parallel arrangement of the two source lines in the second direction in the related art, the arrangement of the source lines 1 provided by the present embodiment winds and switches the source lines to different wiring layer, so as to reduce the space occupied by the source lines 1 in the planar direction, improve the aperture ratio of the display device, and further achieve a better display effect of the liquid crystal display panel 100.

Second Embodiment

Figure 11:
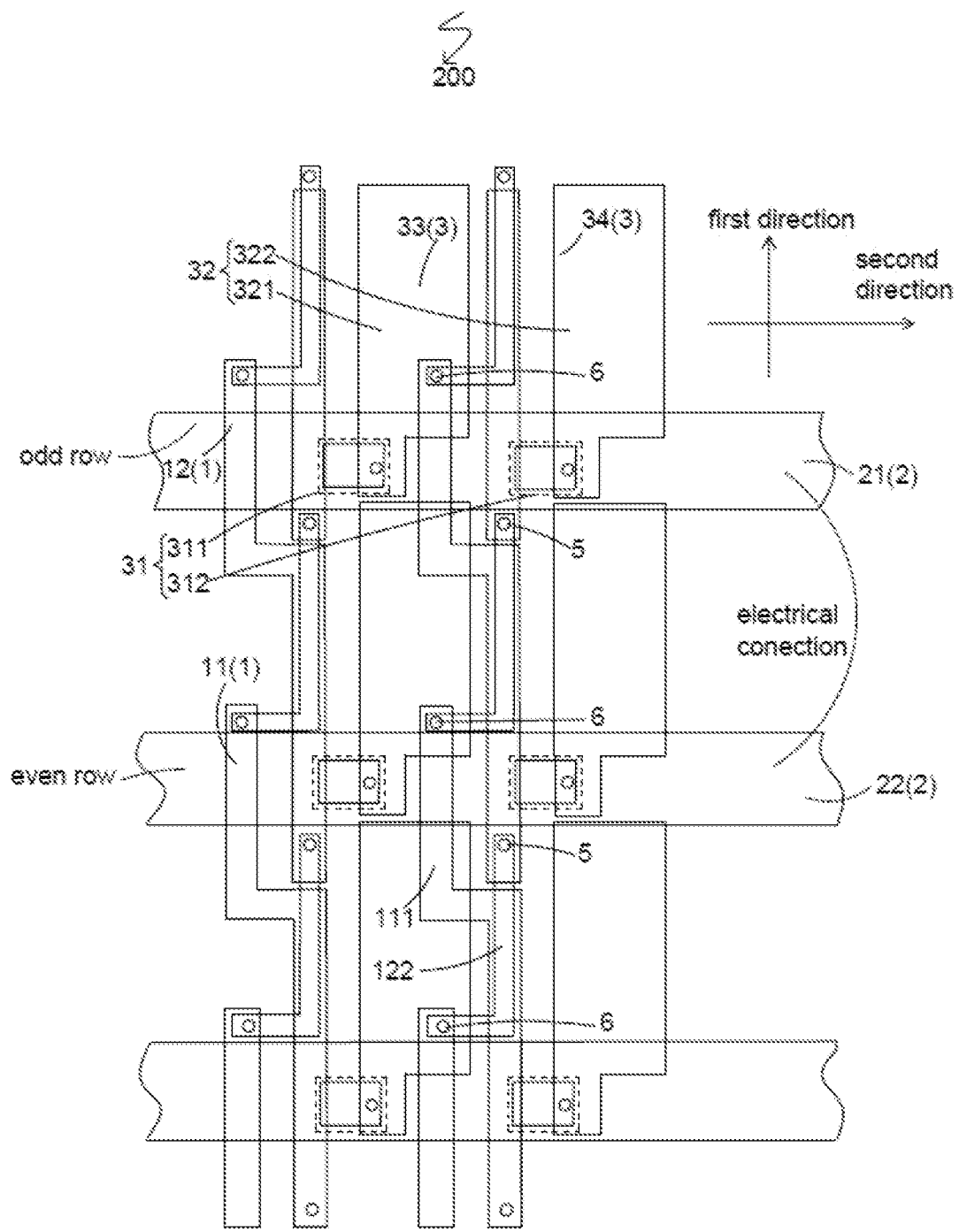
FIG. 11 is a partial structural schematic view of a liquid crystal display panel provided by a second embodiment of the present disclosure.

FIG. 11 is a partial structural schematic view of a liquid crystal display panel 200 provided by a second embodiment of the present disclosure. In the second embodiment, unless otherwise specified, each structure and reference sign thereof are identical with those in the first embodiment, which will not be reiterated herein.

As shown in FIG. 11, the present embodiment mainly differs from the first embodiment in that in the present embodiment, the second contact hole 6 is disposed on the same side of the corresponding first line segment 111 or second line segment 122.

Since, in the first embodiment, the first source line 11 is connected to the second pixel unit 34 and the second source line 12 is connected to the first pixel unit 33, in order to facilitate the connection between the source line 1 and the pixel unit 3, the transistor 31 is disposed adjacent to the source line 1 connected thereto, which leads to the positional difference between the transistors 31 of the pixel units in the odd rows and the even rows. This difference renders the manufacture of the pixel unit 3 complicated.

The liquid crystal display panel 200 provided by the present embodiment changes the position of the second contact hole 6, such that the first source line 11 and the second source line 12 are both connected to two adjacent first pixel units 33 or two adjacent second pixel units 34. Thus, when arranging the transistors 31, the transistors 31 of the pixel units 3 in the odd rows and the even rows may be disposed in the same position, which simplifies the manufacturing process and facilitates the mass production of the liquid crystal display panels 200. Moreover, such a diversified option is realized by the arrangement of the first source line 11 and the second source line 12 in the present embodiment, and specifically by utilizing the positional characteristics of the second contact hole 6 only.

Moreover, the present embodiment not only provides a diversified option for the arrangement of the source lines 1, but also provides more choices for designing the driving circuit (not shown) of the source line 1, and improves the compatibility of the liquid crystal display panel 200.

Third Embodiment

FIGS. 12 to 15 are partial structural schematic views of a liquid crystal display panel 300 provided by a third embodiment of the present disclosure. In the third embodiment, unless otherwise specified, each structure and reference sign thereof are identical with those in the first embodiment, which will not be reiterated herein.

Figure 13:
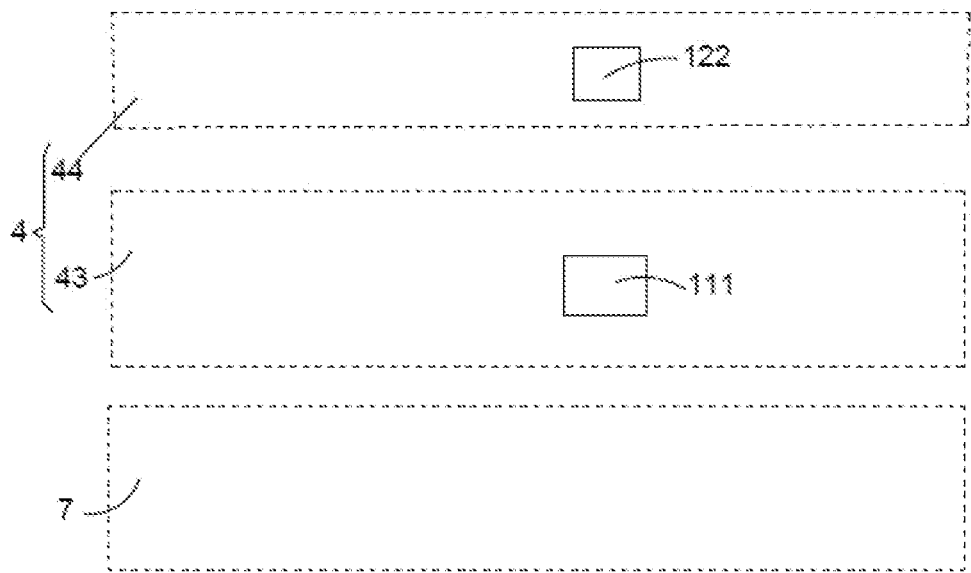
FIG. 13 is a cross-sectional view taken along the line F-F in FIG. 12.

As shown in FIG. 13, the present embodiment mainly differs from the first embodiment and the second embodiment in that one of the first line segment 111 and the second line segment 122 that is closer to the gate line layer 7 is arranged on an upper side of the gate line layer 7.

Specifically, taking the first line segment 111 closer to the gate line layer 7 as an example, in the present embodiment, the source line 1 is disposed on a first wiring layer 43 and a second wiring layer 44, the first wiring layer 43 is disposed on the upper side of the gate line layer 7, and the second wiring layer 44 is disposed on the upper side of the first wiring layer 43, the first line segment 111 is disposed on the first wiring layer 43 closer to the gate line layer 7. Since, in the first embodiment and the second embodiment, the gate line 2 and the second line segment 122 are disposed on the same wiring layer 42(7), consideration shall be given to the position of the gate line 2 when winding the source line 1, or in other words, the source line 1 needs to be wound around the gate line 2. The disadvantage of such an arrangement is that a portion of the source line 1 partially covers the pixel electrode 32 in the planar direction, thereby affecting the aperture ratio of the display panel.

Figure 12:
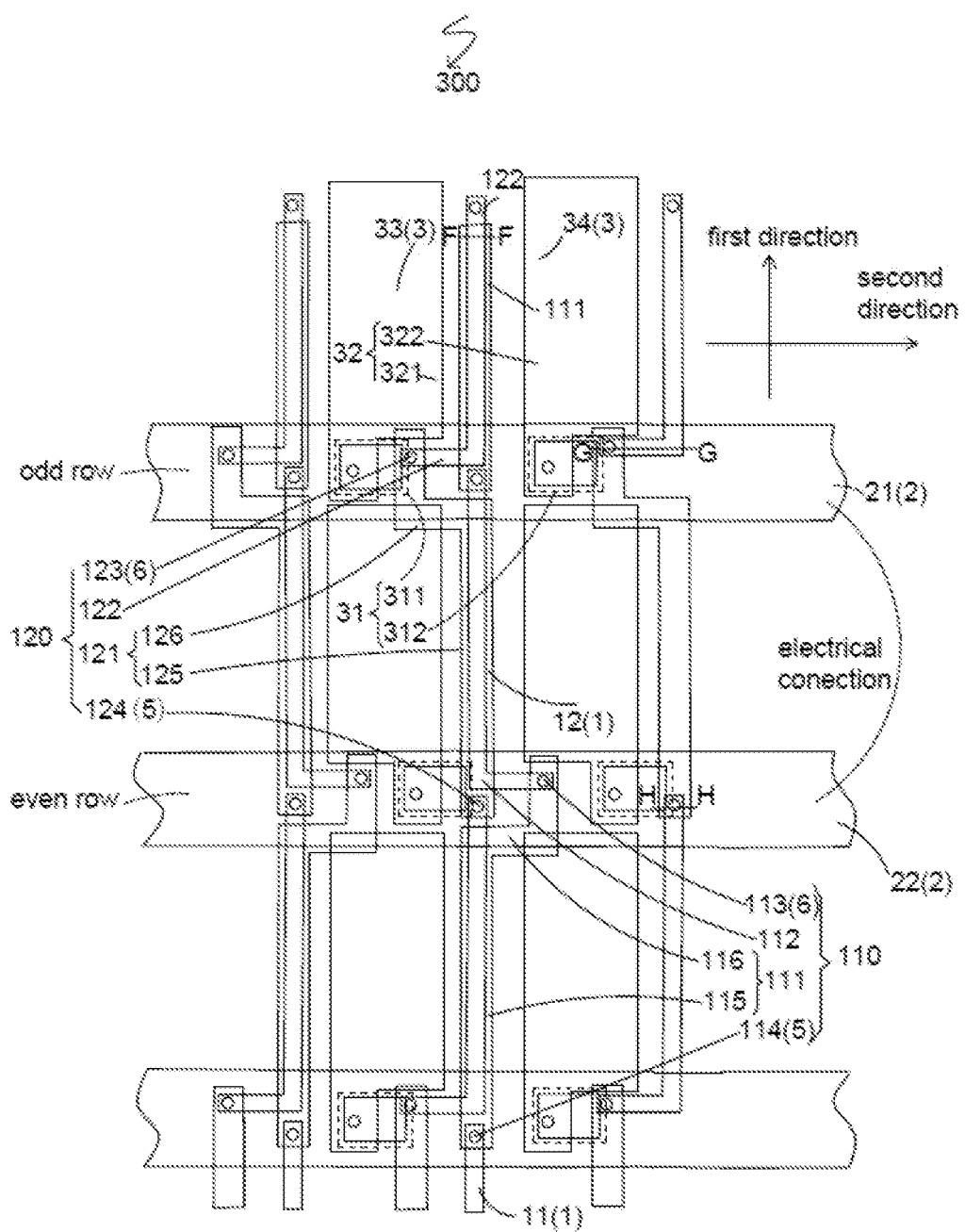
FIG. 12 is a partial structural schematic view of a liquid crystal display panel provided by a third embodiment of the present disclosure.

In the present embodiment, the first line segment 111 and the second line segment 122 are both arranged on the wiring layer 4 on the upper side of the gate line layer 7. In view of FIGS. 1 and 12, as shown in FIG. 1, in the first embodiment, since the second line segment 122 is equivalent to being arranged on the gate line layer 7, in order to realize the arrangement of the portion of the second line segment 122 in the second direction and the switching of the source line 1 between different wiring layers, the portion of the second line segment 122 in the second direction and the first contact hole 5 needs to be disposed outside of the area where the gate line 2 is located in the planar direction. But in the present embodiment, as shown in FIG. 12, since the portions of the source line 1 are all disposed on the upper to side of the gate line layer 7, it is not necessary to consider the position of the gate line 2 when arranging the source line 1, to be specific, the first contact hole 5 and the portion of the second line segment 122 in the second direction may be disposed within the area where the gate line 2 is located in the planar direction, in such a way to reduce the arrangement of the source line 1 on the pixel units 3 as much as possible and further improve the aperture ratio of the display panel.

Meanwhile, since the first wiring layer 43 is disposed independent of the current gate line layer, there is no need to change the current mask of the gate line layer, which may reduce the designing cost of the mask of the gate line layer.

Figure 14:
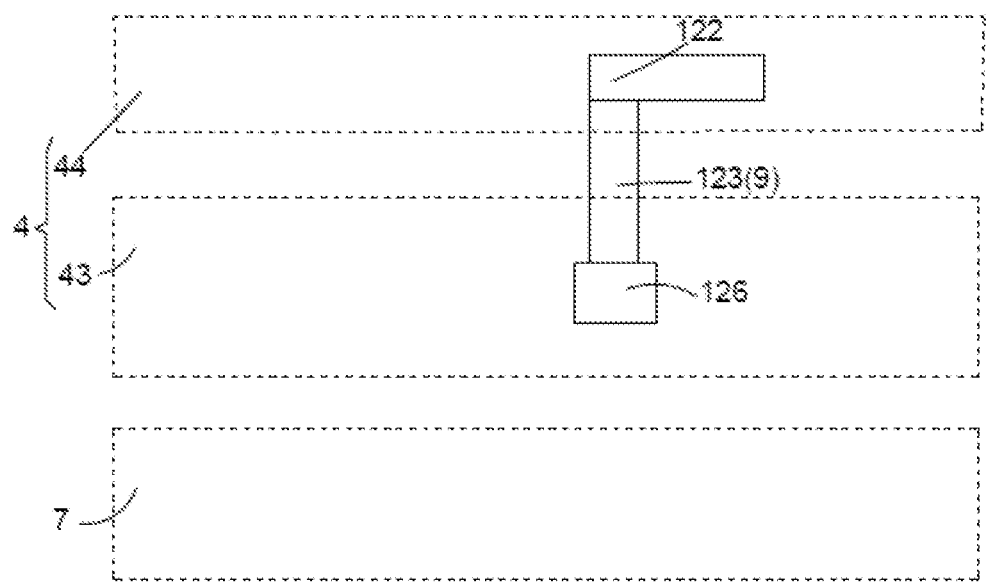
FIG. 14 is a cross-sectional view taken along the line G-G in FIG. 12.
Figure 15:
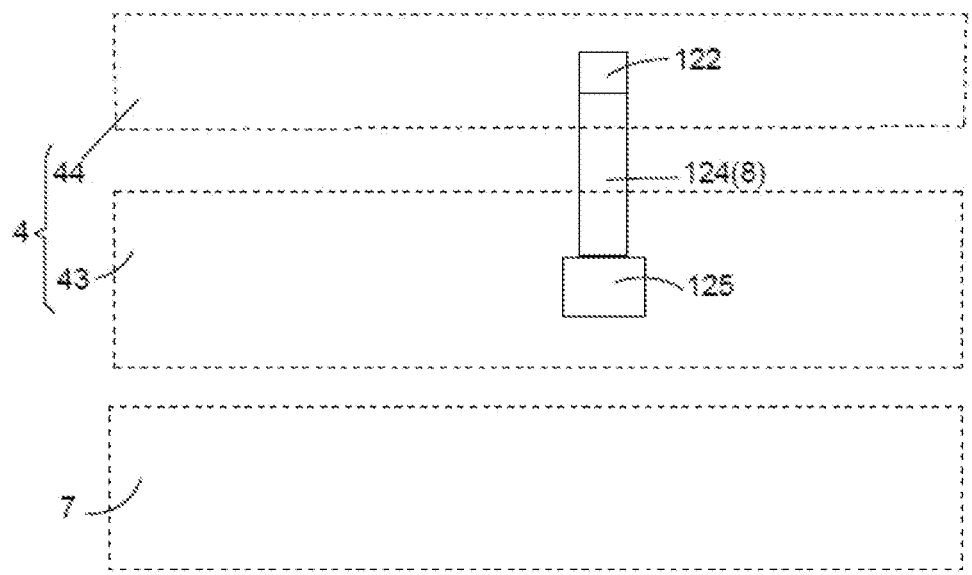
FIG. 15 is a cross-sectional view taken along the line H-H in FIG. 12.

It shall be explained that, in the present embodiment, as shown in FIGS. 13 to 15, there may be an insulating medium layers between the first wiring layer 43, the second wiring layer 44 and the gate line layer 7, or the first wiring layer 43 may be directly disposed on the gate line layer 7, and the second wiring layer 44 may be directly disposed on the first wiring layer 43.

Fourth Embodiment

Figure 16:
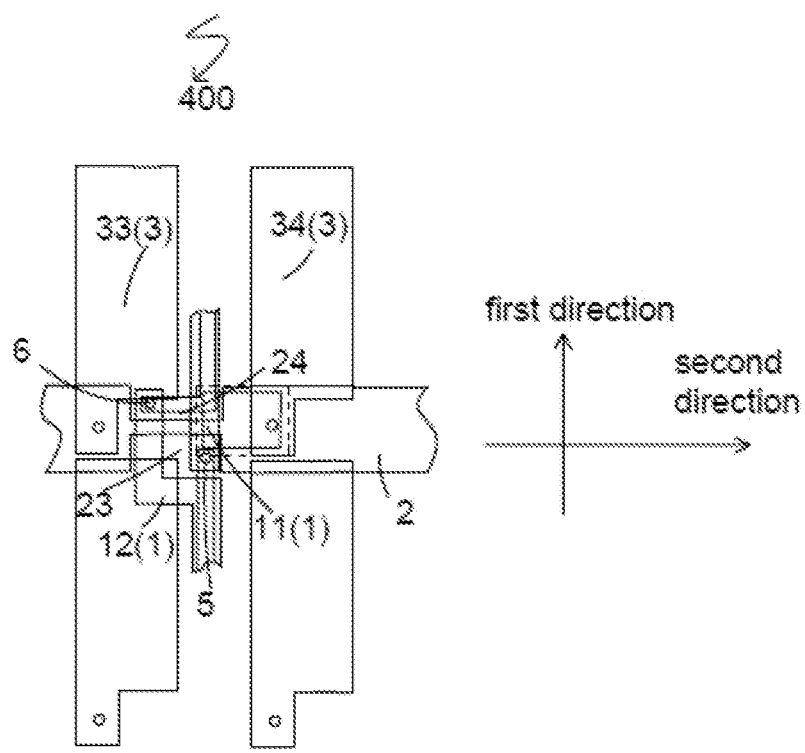
FIG. 16 is a partial structural schematic view of a liquid crystal display panel provided by a fourth embodiment of the present disclosure.
Figure 17:
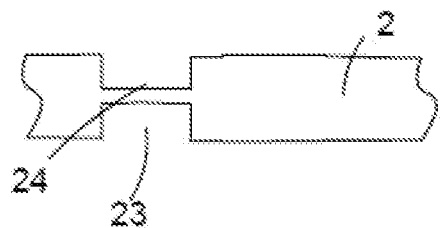
FIG. 17 is a partial structural schematic view of a gate line in FIG. 1.

FIGS. 16 and 17 are partial structural schematic views of a liquid crystal display panel 400 provided by a fourth embodiment of the present disclosure. In the fourth embodiment, unless otherwise specified, each structure and reference sign thereof are identical with those in the first embodiment, which will not be reiterated herein.

As shown in FIGS. 16 and 17, the present embodiment mainly differs from the first embodiment and the second embodiment in that the liquid crystal display panel 400 further includes a first notch 23 which is formed at an edge of the gate lines 2 and a position corresponding to the first source line 11 and the second source line 12, and the first contact hole 5 is at least partially formed at a position of the first notch 23.

In the embodiment of the present disclosure, the liquid crystal display panel 400 further includes a second notch 24, which is formed at the edge of the gate lines 2 and a position corresponding to the first source line 11 and the second source line 12, and the second contact hole 6 is at least partially formed at a position of the second notch 24.

The first notch 23 and the second notch 24 are arranged in such a way that the area with a part having no gate line layer is formed at an edge of the gate line area and recessed into the part of the gate line 2, and that at least a portion of the first contact hole 5 and the second contact hole 6 is formed in the first notch 23 and the second notch 24. When the second line segment 122 and the gate line 2 are disposed on the same wiring layer, the arrangement of the source line 1 is affected by the gate line 2 as little as possible, which reduces the coverage of the source line 1 on the pixel unit 3, and further improves the aperture ratio of the display device. Preferably, the first contact hole 5 and the second contact hole 6 are respectively integrally formed in the first notch 23 and the second notch 24.

Hereto, the embodiments of the present disclosure have been described with reference to the drawings. However, those skilled in the art can readily understand that the scope of protection of the present disclosure is obviously not limited to these specific embodiments. On the premise of not departing from the principle of the present disclosure, those skilled in the art can make equivalent changes or replacements of the relevant technical features, and the technical solutions after these changes or replacements will fall into the scope of protection of the present disclosure.

What is claimed is:

1. A liquid crystal display panel comprising:
a plurality of source lines extending in a first direction, and including a first source line and a second source line;
a plurality of gate lines extending in a second direction different from the first direction, and crossing the plurality of source lines; and
a plurality of pixel units defined by the plurality of source lines and the plurality of gate lines, in which a plurality of transistors and a plurality of pixel electrode are disposed, respectively, wherein
a first pixel row having a first set of two or more of the plurality of pixel units is adjacent to a second pixel row having a second set of two or more of the plurality of pixel units in the first direction,
the first source line is connected to a first pixel unit of the first pixel row,
the second source line is connected to a second pixel unit of the second pixel row,
the first source line comprises a first line segment disposed on a first wiring layer,
the second source line comprises a second line segment, and the second line segment is disposed on a second wiring layer different from the first wiring layer,
a portion of the first line segment and a portion of the second line segment are located between a first pixel column having the first pixel unit and a second pixel column having the second pixel unit,
the first pixel column and the second pixel column are adjacent in the second direction, and
the first line segment is electrically isolated from the second line segment.

2. The liquid crystal display panel according to claim 1, wherein at least a portion of the first line segment and the second line segment overlap each other in a direction perpendicular to the liquid crystal display panel.

3. The liquid crystal display panel according to claim 1, further comprising:

a first contact hole, which is located between two adjacent columns of the pixel units and adjacent to the gate line; and a first plug, which is located in the first contact hole and electrically connects the first source line or the second source line of different wiring layers.

4. The liquid crystal display panel according to claim 3, further comprising:

a second contact hole, which is disposed at a position closer to the pixel electrode than the first contact hole and disposed adjacent to the gate line; and a second plug, which is located in the second contact hole and electrically connects the first source line or the second source line of different wiring layers.

5. The liquid crystal display panel according to claim 1, wherein the gate lines include a first gate line and a second gate line, and the first gate line is electrically connected to a second gate line adjacent to the first gate line.

6. The liquid crystal display panel according to claim 5, wherein a plurality of the second contact holes are located on opposite sides of the corresponding first line segment or the second line segment.

7. The liquid crystal display panel according to claim 5, wherein a plurality of the second contact holes are located on the same side of the corresponding first line segment or the second line segment.

8. The liquid crystal display panel according to claim 1, wherein one of a first line segment or the second line segment which is adjacent to the gate line layer is arranged at the same wiring layer with the gate lines.

9. The liquid crystal display panel according to claim 1, wherein one of a first line segment or the second line segment which is adjacent to the gate line layer is arranged on an upper side of the gate line layer.

10. The liquid crystal display panel according to claim 3, further comprising a first notch, which is formed at an edge of the gate lines and a position corresponding to the first source line or the second source line, and the first contact hole is at least partially formed at a position of the first notch.

* * * * *